(12) United States Patent
Ozawa et al.

(10) Patent No.: US 6,827,129 B2
(45) Date of Patent: Dec. 7, 2004

(54) VEHICLE-MOUNTED STRUCTURE FOR HEAT EXCHANGER

(75) Inventors: Ikuo Ozawa, Toyoake (JP); Toshiki Sugiyama, Kariya (JP); Norihisa Sasano, Ama-gun (JP); Masakazu Watanabe, Nagoya (JP); Hisashi Kayano, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/892,267

(22) Filed: Jun. 27, 2001

(65) Prior Publication Data

US 2001/0050160 A1 Dec. 13, 2001

Related U.S. Application Data

(63) Continuation of application No. PCT/JP00/07602, filed on Oct. 27, 2000.

(30) Foreign Application Priority Data

Oct. 28, 1999 (JP) .......................................... 11-307494

(51) Int. Cl.⁷ ................................................. F28F 9/00
(52) U.S. Cl. .............................. 165/67; 165/41; 165/68; 165/140; 165/149; 165/153; 180/68.1; 180/68.4
(58) Field of Search .............................. 165/41, 67, 68, 165/140, 153, 149, 906, 47; 180/68.1, 68.4, 392

(56) References Cited

U.S. PATENT DOCUMENTS

| | | | |
|---|---|---|---|
| 3,086,606 A | * | 4/1963 | Schwiering et al. ....... 180/68.4 |
| 3,696,730 A | * | 10/1972 | Masuda et al. .......... 237/12.3 A |
| 4,114,714 A | * | 9/1978 | Fachbach et al. .......... 180/68.1 |
| 4,141,426 A | * | 2/1979 | Hamada et al. ............ 180/68.4 |
| 4,164,262 A | * | 8/1979 | Skatsche et al. ........... 180/68.1 |
| 4,428,447 A | * | 1/1984 | Malen ....................... 180/68.4 |
| 4,579,184 A |   | 4/1986 | Hiramoto |
| 5,046,554 A | * | 9/1991 | Iwasaki et al. ............. 165/140 |
| 5,123,695 A | * | 6/1992 | Kanemitsu et al. ......... 296/194 |
| 5,125,454 A |   | 6/1992 | Creamer et al. |
| 5,172,656 A | * | 12/1992 | Wright .................... 123/41.01 |
| 5,271,473 A | * | 12/1993 | Ikeda et al. ................. 180/68.4 |
| 5,348,114 A | * | 9/1994 | Yamauchi .................... 180/291 |
| 5,358,304 A | * | 10/1994 | Kanemitsu et al. .... 296/193.09 |
| 5,409,288 A | * | 4/1995 | Masuda ....................... 296/194 |
| 5,570,737 A | * | 11/1996 | Tokutake ..................... 165/67 |
| 5,658,041 A | * | 8/1997 | Girardot et al. ....... 296/193.09 |
| 5,671,803 A | * | 9/1997 | Tepas et al. .................. 165/41 |

(List continued on next page.)

FOREIGN PATENT DOCUMENTS

| | | | | |
|---|---|---|---|---|
| DE | 198 27 451 | | 1/1999 | |
| EP | 0 178 266 | * | 4/1986 | ............ B60K/5/10 |
| JP | U-3-64376 | | 6/1991 | |
| JP | A-4-63774 | | 2/1992 | |
| JP | U-4-59583 | | 5/1992 | |
| JP | A-4-212683 | | 8/1992 | |
| JP | 406144023 A | * | 6/1994 | ........... B60K/11/04 |
| JP | A-9-257388 | | 10/1997 | |
| JP | A-11-108581 | | 4/1999 | |
| WO | WO 090/26078 | | 5/2000 | |

OTHER PUBLICATIONS

Patent Astracts of Japan, Publication No. 11–011348 dated Jan. 19, 1999.

*Primary Examiner*—Henry Bennett
*Assistant Examiner*—Nihir Patel
(74) *Attorney, Agent, or Firm*—Harness, Dickey & Pierce, PLC (57) ABSTRACT

A front-end module, including a heat exchanger including a radiator and a condenser integrated with each other, brackets, etc. and having a dual function as a strength member for the vehicle body, is mounted on an automotive vehicle. As a result, the front end panel is eliminated, and a simple structure is provided in which the parts which can be assembled on the front end of the vehicle, including the radiator, the condenser, headlights, a hood lock, a horn and sensors, can be assembled on the vehicle.

22 Claims, 9 Drawing Sheets

U.S. PATENT DOCUMENTS

| | | | | |
|---|---|---|---|---|
| 6,155,335 A | * | 12/2000 | Acre et al. | 165/41 |
| 6,186,583 B1 | * | 2/2001 | Martin | 296/193.09 |
| 6,189,958 B1 | * | 2/2001 | Guyomard et al. | 180/68.4 |
| 6,196,624 B1 | * | 3/2001 | Bierjon et al. | 296/203.02 |
| 6,216,810 B1 | * | 4/2001 | Nakai et al. | 180/68.4 |
| 6,227,321 B1 | * | 5/2001 | Frascaroli et al. | 180/68.4 |
| 6,293,615 B1 | * | 9/2001 | Tarahomi | 296/193.09 |
| 6,334,645 B1 | * | 1/2002 | Ban | 296/198 |
| 6,357,521 B1 | * | 3/2002 | Sugimoto et al. | 165/173 |
| 6,382,709 B1 | * | 5/2002 | Chirifu et al. | 296/193.1 |
| 6,412,855 B1 | * | 7/2002 | Cantineau et al. | 296/187.01 |
| 6,450,276 B1 | * | 9/2002 | Latcau | 180/68.4 |
| 6,464,289 B2 | * | 10/2002 | Sigonneau et al. | 296/193.09 |
| 6,502,653 B1 | * | 1/2003 | Balzer et al. | 180/68.4 |
| 6,508,506 B2 | * | 1/2003 | Ozawa et al. | 296/203.02 |
| 6,516,906 B2 | * | 2/2003 | Sasano et al. | 180/68.4 |
| 6,517,146 B1 | * | 2/2003 | Cheron et al. | 296/193.09 |
| 6,540,037 B2 | * | 4/2003 | Sasano et al. | 180/68.1 |
| 6,540,284 B2 | * | 4/2003 | Miyata | 296/203.02 |
| 6,547,317 B1 | * | 4/2003 | Cheron et al. | 296/193.01 |
| 6,571,898 B2 | * | 6/2003 | Guyomard | 180/68.4 |
| 6,578,650 B2 | * | 6/2003 | Ozawa et al. | 180/68.1 |
| 6,668,956 B1 | * | 12/2003 | Pelage et al. | 180/68.4 |
| 6,672,652 B2 | * | 1/2004 | Takeuchi et al. | 296/193.09 |
| 6,679,545 B1 | * | 1/2004 | Balzer et al. | 296/193.09 |
| 6,681,876 B1 | * | 1/2004 | Haneda et al. | 180/68.4 |
| 6,708,790 B2 | * | 3/2004 | Ozawa et al. | 180/68.4 |
| 6,715,573 B2 | * | 4/2004 | Emori et al. | 180/68.4 |
| 6,729,424 B2 | * | 5/2004 | Joutaki et al. | 180/68.4 |
| 6,742,615 B2 | * | 6/2004 | Cristante et al. | 180/68.4 |
| 6,757,958 B1 | * | 7/2004 | Baumann et al. | 29/469 |

* cited by examiner

VEHICLE-MOUNTED STRUCTURE FOR HEAT EXCHANGER

CROSS-REFERENCE TO RELATED APPLICATION

This is a continuation of PCT Application No. PCT/JP00/07602, filed Oct. 27, 2000.

BACKGROUND OF THE INVENTION

1. Field of the Invention

The present invention relates to a structure for mounting a heat exchanger on an automotive vehicle, effectively applicable to an automotive vehicle with a radiator and a condenser mounted on the front side thereof.

2. Description of the Related Art

As is well known, the radiator of a vehicle, such as an ordinary passenger car, is mounted on the front-end of the engine compartment (of a vehicle) through a front-end panel of metal or resin. This front end panel extends transversely across the vehicle and has the ends thereof fixed to the body (side member) on the vehicle side and constitutes a part of a "strength member" (reinforcing member) of the body on the vehicle front.

In the conventional vehicle-mounted structure of a heat exchanger, however, the heat exchanger is assembled on the front-end panel after assembling the front-end panel on the vehicle. Therefore, it is difficult to reduce the number of assembly steps and thus to reduce the production cost of the vehicle.

SUMMARY OF THE INVENTION

In view of the aforementioned problems of the prior art, the object of the present invention is to mount the heat exchanger on the vehicle with a simple structure.

In order to achieve the object described above, according to the present invention, there is provided a structure for mounting a heat exchanger on a vehicle, characterized in that the heat exchanger mounted on the vehicle has a dual function as a reinforcing member for reinforcing the vehicle body.

Also, according to the present invention, there is provided a vehicle-mounted structure for a heat exchanger characterized in that beam-like brackets extending transversely across the vehicle are included in the heat exchanger, which is mounted on the vehicle through the brackets.

Also, according to the present invention, there is provided a heat exchanger mounted on a vehicle, characterized by comprising a plurality of tubes for allowing a fluid to flow therethrough, header tanks arranged at the longitudinal ends of the tubes and communicating with a plurality of the tubes, and the beam-like brackets mounted on the header tanks, extending in horizontal direction and fixed on the vehicle.

Also, according to the present invention, there is provided a heat exchanger mounted on a vehicle, comprising:

a first heat exchanger comprising a plurality of first tubes for allowing a first fluid to flow therethrough and first header tanks arranged at the longitudinal ends of the first tubes for communicating with a plurality of the first tubes thereby to exchange heat between the air and the first fluid; and a second heat exchanger including a plurality of second tubes for allowing a second fluid to flow therethrough and second header tanks arranged at the longitudinal ends of the second tubes for communicating with a plurality of the second tubes thereby to exchange heat between the air and the second fluid;

characterized in that the two heat exchangers are arranged integrally in series with each other along the direction of airflow, and the beam-like brackets extending in horizontal direction fixedly on the vehicle are coupled to at least the first header tanks.

Also, according to the present invention, there is provided a heat exchanger mounted on a vehicle, comprising a plurality of tubes for allowing a fluid to pass therethrough, header tanks arranged at the longitudinal ends of the tubes and extending in the direction perpendicular to the length of the tubes while communicating with a plurality of the tubes, and beamlike brackets arranged on the head tanks and extending in horizontal direction fixedly on the vehicle, characterized in that each header tank is formed with a reinforcing wall projected in the direction perpendicular to the length of the header tank and extending longitudinally to the header tank.

In any case, the heat exchanger of a simple structure free of the front-end panel can be mounted on the vehicle, and therefore the number of steps of assembling the heat exchanger can be reduced.

Also, the condenser and other heat exchangers can be assembled removably on the reinforcing walls, which increase the flexural rigidity (geometrical moment of inertia) of the header tanks. Even in the case where the condenser or other heat exchangers are removed, therefore, the rigidity of the head tanks can be prevented from decreasing.

By the way, according to this invention, each of the brackets may be formed with an assembly portion for assembling equipment other than the heat exchanger.

Also, the brackets may each be formed with an assembly portion for assembling the headlight.

Further, the brackets may be of two types, one formed with the assembly portion and the other not formed with the assembly portion.

Furthermore, the two types of brackets and the assembly portions may be integrated with each other.

Incidentally, the reference numerals indicated in the parentheses for each means described above illustrate the correspondence to the specific means included in the embodiments described later.

The above and other features and advantages of the present invention will be made apparent by the detailed description taken in conjunction with the accompanying drawings.

DESCRIPTION OF THE PREFERRED EMBODIMENTS (First Embodiment)

Figure 1:
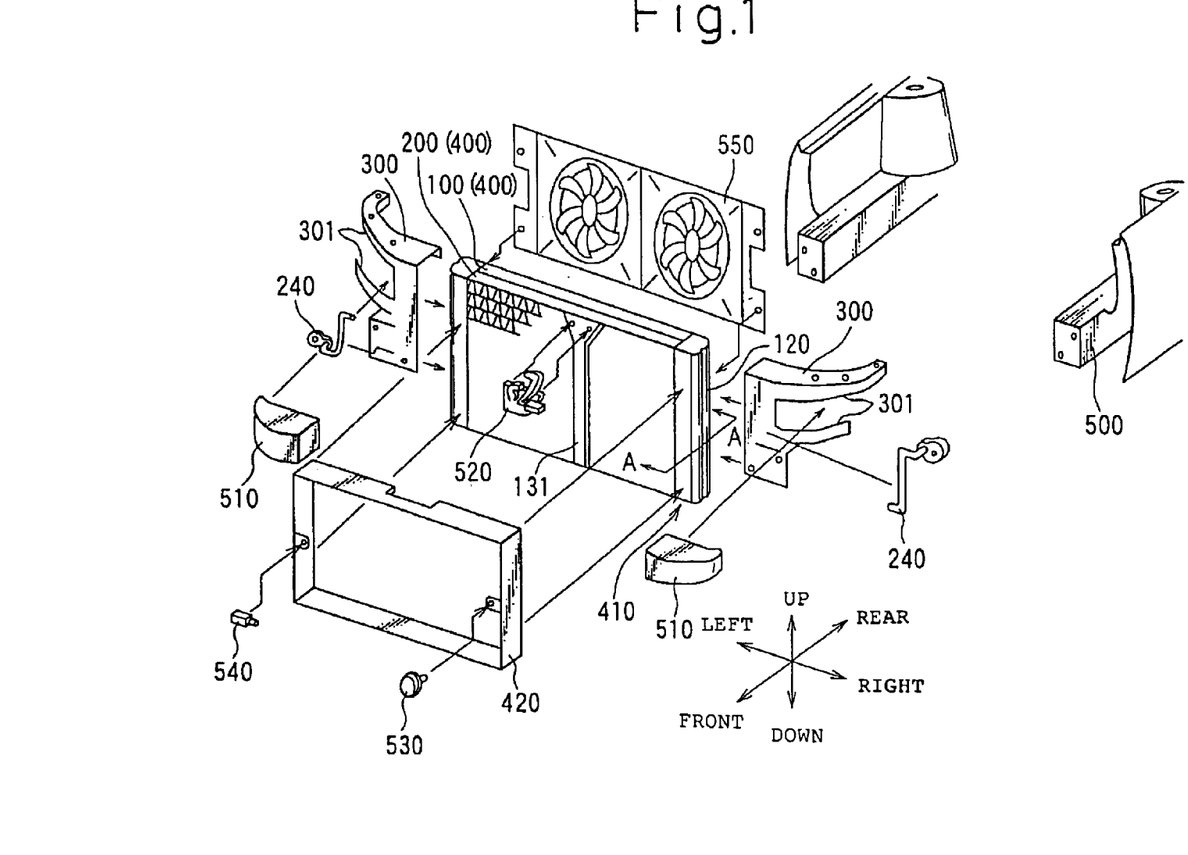
FIG. 1 is an exploded perspective view showing a structure for mounting a heat exchanger according to a first embodiment of the present invention.

In this embodiment, a vehicle-mounted structure of a heat exchanger according to this invention is used for mounting, on the front side of the vehicle (engine compartment), a radiator for cooling the cooling water of an engine (not shown) and a condenser for aggregating by cooling the refrigerant in the refrigeration cycle. FIG. 1 is an exploded perspective view showing a vehicle-mounted structure of a heat exchanger according to this embodiment. In FIG. 1, reference numeral 100 designates a radiator and numeral 200 a condenser.

Figure 2:
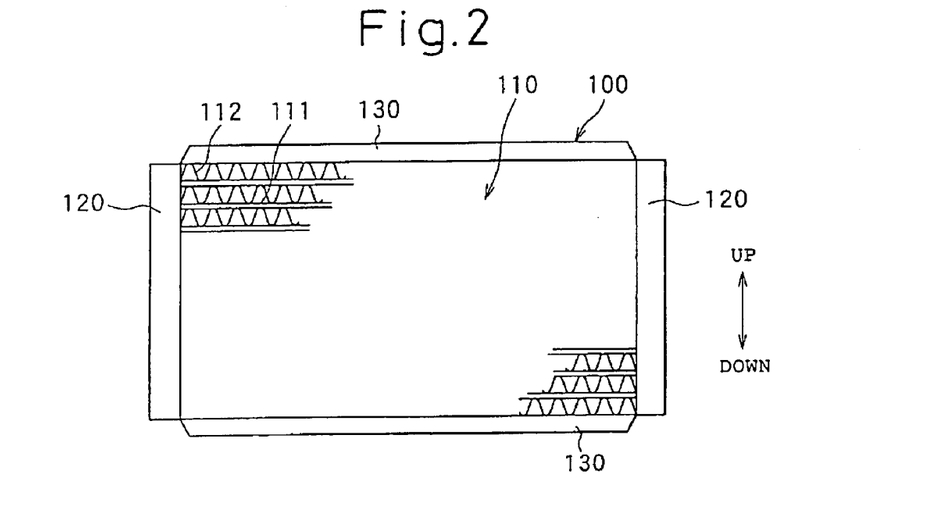
FIG. 2 is a front view of a radiator according to the first embodiment.

The radiator 100, as shown in FIG. 2 has a radiator core 110 and radiator tanks (first header tanks) 120, and is well known. The radiator core 110 includes a plurality of radiator tubes 111 for passing the cooling water (first fluid) therethrough and fins 112 arranged between the radiator tubes 111 for promoting the heat exchange between the cooling water and the air. The radiator tanks 120, on the other hand, are arranged on the longitudinal ends, respectively, of the radiator tubes (first tubes) 111 and extend in the direction (vertical direction in this embodiment) perpendicular to the length (horizontal direction in this embodiment) of the radiator tubes 111 while at the same time communicating with the radiator tubes.

By the way, at each of the upper and lower ends of the radiator core 110, a side plate 130 constituting a reinforcing member for the radiator core 110, together with the radiator tubes 111 and the fins 112, are brazed integrally to the radiator tank 120.

Figure 3:
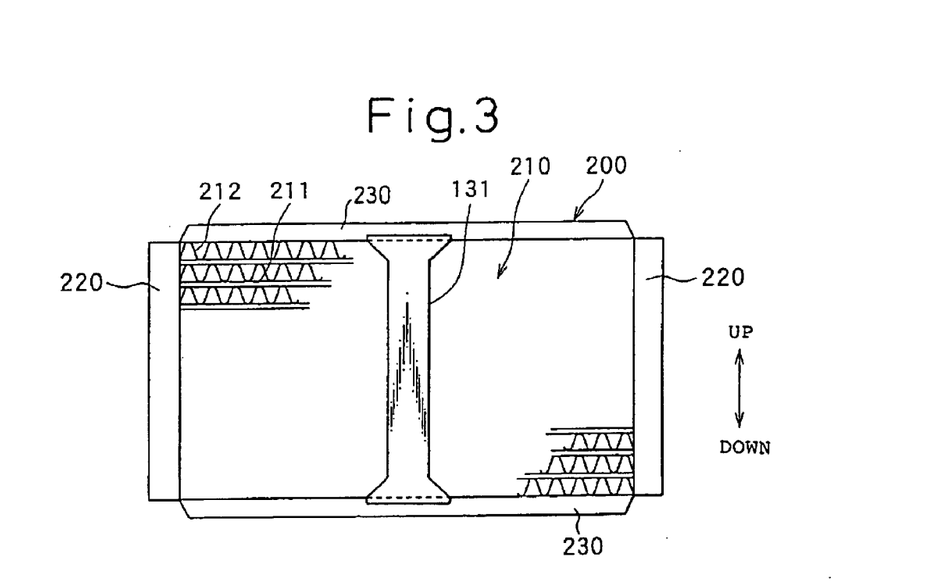
FIG. 3 is a front view of a condenser according to the first embodiment.

The condenser 200, like the radiator 100, is configured of, as shown in FIG. 3, a condenser core 210 and condenser tanks (second header tanks) 220, and is well known. The condenser core 210 includes a plurality of condenser tubes 211 for passing the refrigerant (second fluid) therethrough and fins 212 arranged between the condenser tubes 211 for promoting the heat exchange between the refrigerant and the air. The condenser tanks 220, on the other hand, are arranged on the longitudinal ends, respectively, of the condenser tubes (second tubes) 211 and extend in the direction (vertical direction in this embodiment) perpendicular to the length (horizontal direction in this embodiment) of the condenser tubes 211 while at the same time communicating with the condenser tubes.

By the way, at each of the upper and lower ends of the condenser core 210, a side plate 230 constituting a reinforcing member for the condenser core 210 and a center brace 131 to which a hood lock for locking a bonnet (engine hood) is secured as described later, are brazed to the condenser tank 220 together with the condenser tubes 211 and the fins 212.

Figure 4:
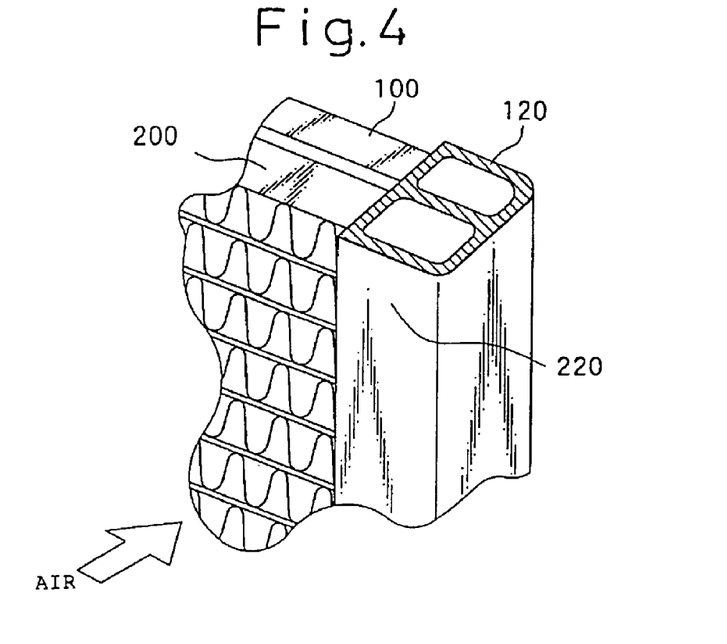
FIG. 4 is a perspective sectional view taken in line A—A in FIG. 1.

The radiator 100 and the condenser 200 are integrally arranged in series with each other along the direction of air flow, as shown in FIG. 1, with the condenser 200 located upstream of the radiator 100 in the air flow. According to this embodiment, as shown in FIG. 4, the radiator 100 and the condenser 200 are integrated with each other by integrally molding the tanks 120, 220 by using, as a means for integration, extrusion or drawing of an aluminum material.

The tanks 120, 220 thus integrated are provided with beam-like brackets 300 extending horizontally and fixed to the vehicle body (side members 500). The brackets 300, which are formed by pressing an aluminum sheet, are integrally brazed to the tanks 120, 230 at the same time as the tubes 111, 211, the fins 112, 212, the tanks 120, 220 and the side plates 130, 230.

As long as an assembly (hereinafter referred to as a front end module) 410 made up of a heat exchanger 400 including the radiator 100 and the condenser 200 integrated with each other and the brackets 300 is fixed on the vehicle body (side member 500), the whole of the front end module 410 functions as what is conventionally called a "front end panel", i.e. a strength member (reinforcing member) of the vehicle body on the front side thereof.

As a result, according to this embodiment, the various vehicle parts conventionally assembled on the front end panel, including head lamps such as headlight 510, a hood lock 520 for keeping the bonnet (engine hood) closed, a resin-made air duct 420 for leading the air to the heat exchanger 400, a horn 530, various sensors 540 and a blow fan 550 are assembled on the front end module 410.

The portion of the bracket 300 extending transversely of the vehicle makes up a headlight assembly (assembling portion) 301 having built therein a housing, a reflector, a glass sheet, etc. not shown.

By the way, numeral 240 designates a refrigerant pipe made of metal and brazed to the bracket 300. The air duct 420 is secured to the heat exchanger 400 by fastening means such as bolts.

Now, the features of this embodiment will be explained.

The front end module 410 including the heat exchanger 400 and the brackets 300 is mounted on the vehicle while functioning as a strength member of the vehicle body. Therefore, the heat exchanger 400 can be mounted on the vehicle with a simple structure free of the front end panel, and the number of the steps for assembling the heat exchanger 400 can be reduced.

Also, in view of the fact that the front end module 410 functions as a strength member of the vehicle body, the various parts (hereinafter referred to as the front end parts) conventionally assembled on the front end panel are not individually assembled on the vehicle. Instead, the front end parts are assembled on the front end module 410 in advance, and then the front end module 410 is assembled on the vehicle. In this way, the heat exchanger 400 and the front end parts can be assembled on the vehicle in one step. As a result, the number of the vehicle assembly steps can be reduced, thereby making it possible to decrease the vehicle production cost.

(Second Embodiment)

In the first embodiment, the radiator tanks 120 and the condenser tanks 220 are integrally formed, and therefore the radiator 100 and the condenser 200 cannot be separated from each other. According to the second embodiment, on the other hand, only the radiator 100 is mounted at the time of vehicle production (shipment from the factory), and the condenser 200 (vehicle air climate control system) can be mounted after shipment from the factory (for example, by vehicle dealers).

Figure 5:
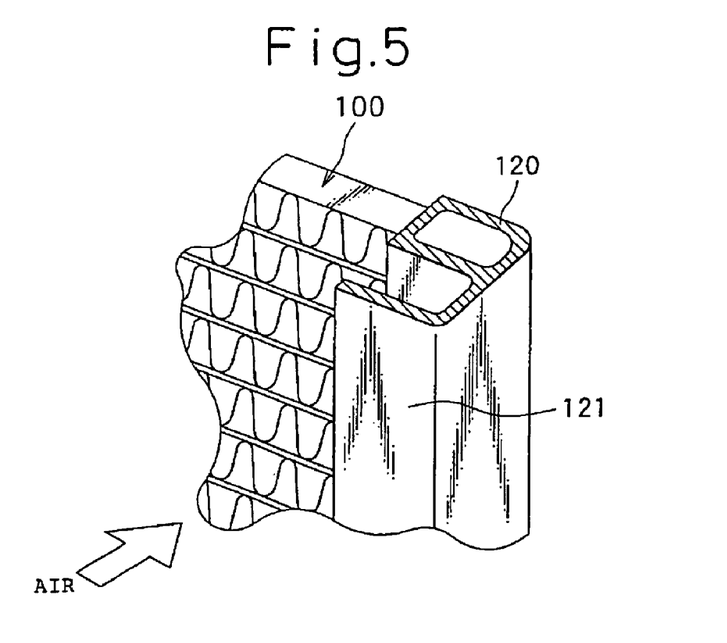
FIG. 5 is a perspective view showing a portion corresponding to the sectional line A—A of FIG. 1 in the structure for mounting a heat exchanger according to a second embodiment of the invention.
Figure 6:
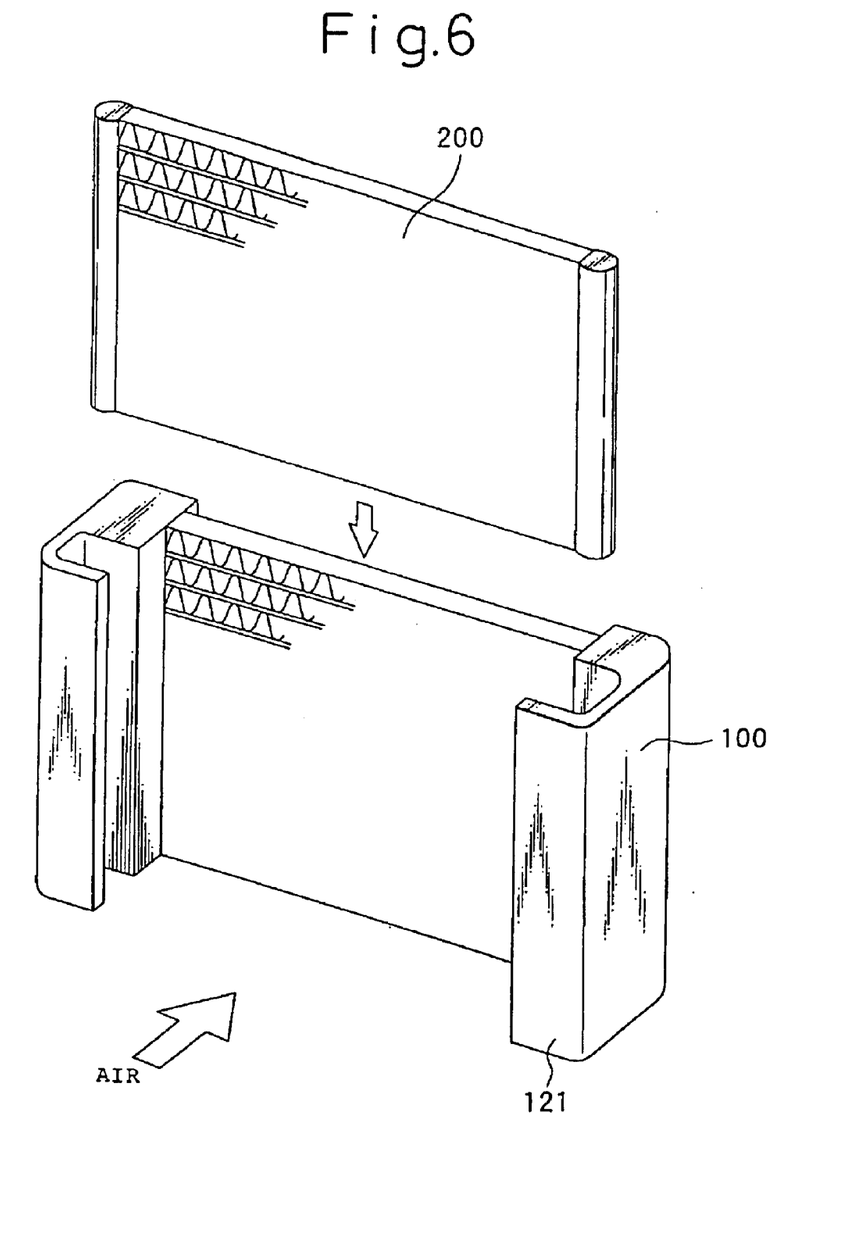
FIG. 6 is an exploded perspective view of a heat exchanger according to the second embodiment.

Specifically, as shown in FIGS. 5 and 6, a reinforcing flange (reinforcing wall) 121 having an L-shaped section projected in the direction (upstream in the air flow according to this embodiment) perpendicular to the length of the radiator tank 120 and extending longitudinally of the radiator tank 120 is integrally formed with the radiator tank 120 by extrusion or drawing.

As a result, the condenser 200 can be easily assembled and secured in position on the radiator 100 by inserting the condenser 200 between the reinforcing flange 121 and the radiator tank 120, as shown in FIG. 6.

The front module 410 on which the condenser 200 has yet to be assembled and which includes only the radiator 100 may have a smaller function (lower strength) as a vehicle reinforcing member. According to this embodiment, however, the provision of the reinforcing flange 121 projected in the direction perpendicular to the length of each radiator tank 120 increases the flexural rigidity (geometrical moment of inertia) of the radiator tank 120, and therefore can prevent the adverse effect on the function as a vehicle reinforcing member.

As a result, according to this embodiment, the condenser 200 can be rendered removable without adversely affecting the function of the front end module 410 as a reinforcing member.

(Third Embodiment)

In the first and second embodiment, the radiator 120 is made of metal (aluminum). According to the third embodiment, on the other hand, a radiator 120 made of a resin is employed.

Figure 7:
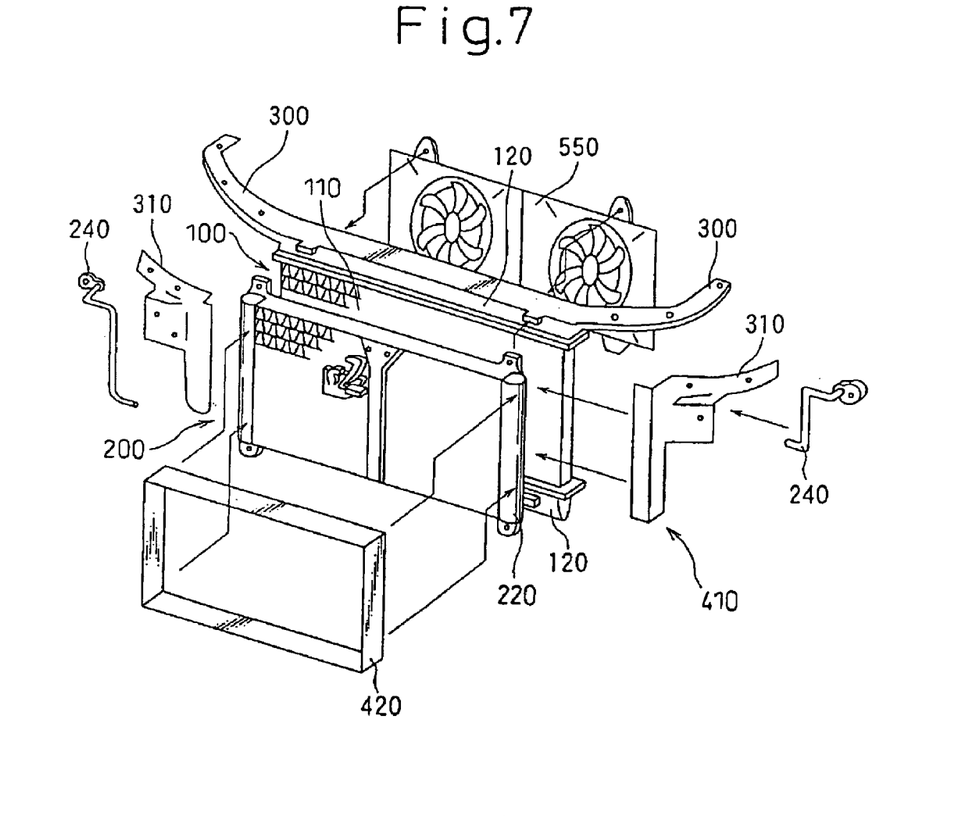
FIG. 7 is an exploded perspective view showing a structure for mounting a heat exchanger according to a third embodiment.

According to this embodiment, as shown in FIG. 7, the radiator tanks 120 made of resin are located at the upper and lower ends, respectively, of the radiator core 110 in a vertical position coinciding with the length of the radiator tubes 111, and a bracket 300 formed of a resin material is integrated with the radiator tank 120.

By the way, according to this embodiment, in addition to the bracket 300 (hereinafter referred to as the first bracket 300 in the following embodiments), second brackets 310 made of metal (aluminum) extending in horizontal direction from the condenser tanks 220, respectively, and fixed on the vehicle are brazed to the condenser tanks 220, respectively. The condenser 200 is integrally secured to the radiator 100 by fastening (fixing) means such as bolts. Incidentally, according to this embodiment, each headlight 510 is assembled on the corresponding second bracket 310.

As a result, according to this embodiment, the first bracket 300 formed integrally with one of the radiator tanks 120, the second brackets 310 integrated with the condenser tanks 220, respectively, the radiator 100 and the condenser 200 make up a front end module 410.

The second brackets 310, though made of metal in this embodiment, are not limited to metal, but may be made of resin or other materials. Also, the metal portions are joined not necessarily by brazing but may be joined by other fastening means such as welding or bolts.

(Fourth Embodiment)

Figure 8:
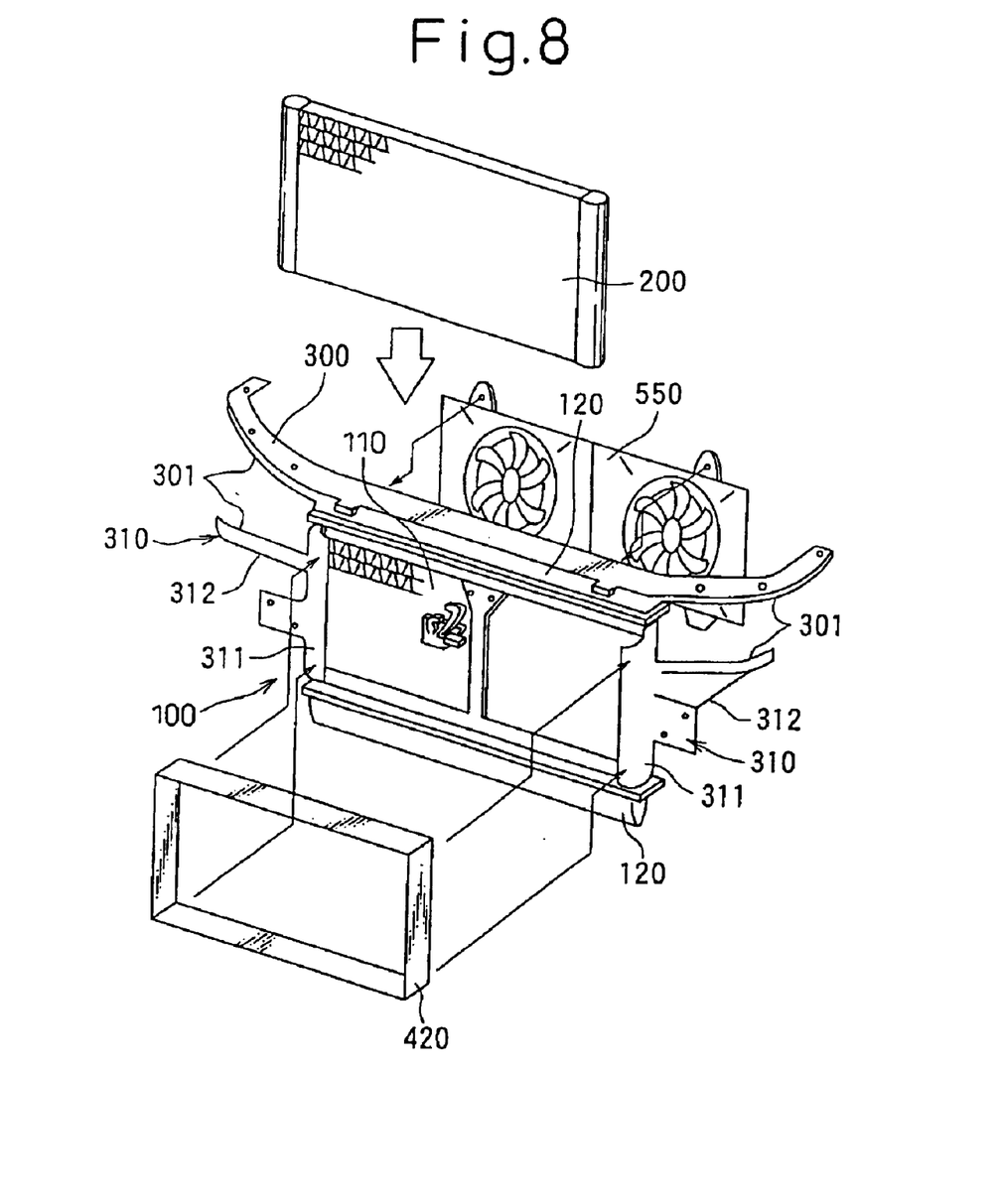
FIG. 8 is an exploded perspective view showing a structure for mounting a heat exchanger according to a fourth embodiment.

According to this embodiment, as in the second embodiment, the condenser 200 can be assembled, after shipment from the factory, on the radiator 100 having the radiator tanks 120 made of resin.

Specifically, as shown in FIG. 8, the second brackets 310 are brazed to the radiator 110 while at the same time brazing the air duct 420 of metal (aluminum) to the second brackets 310.

The second brackets 310 are each formed to include a portion constituting a bracket body 311 brazed to the radiator core 110 and an arm 312 extending horizontally from the bracket body 311. In order to enable the bracket body 311 to exhibit a similar function to the reinforcing flange 121 (see the second embodiment shown in FIGS. 5 and 6), the bracket body 311 has a section substantially in the shape of an arc corresponding one half of a circle or an L.

The method of joining the second brackets 310 is not limited to brazing, but may use such fastening means as welding or bolts. Also, the air duct 420, if made of resin, is desirably assembled on the second brackets 310 by the fastening means such as bolts.

(Fifth Embodiment)

Figure 9:
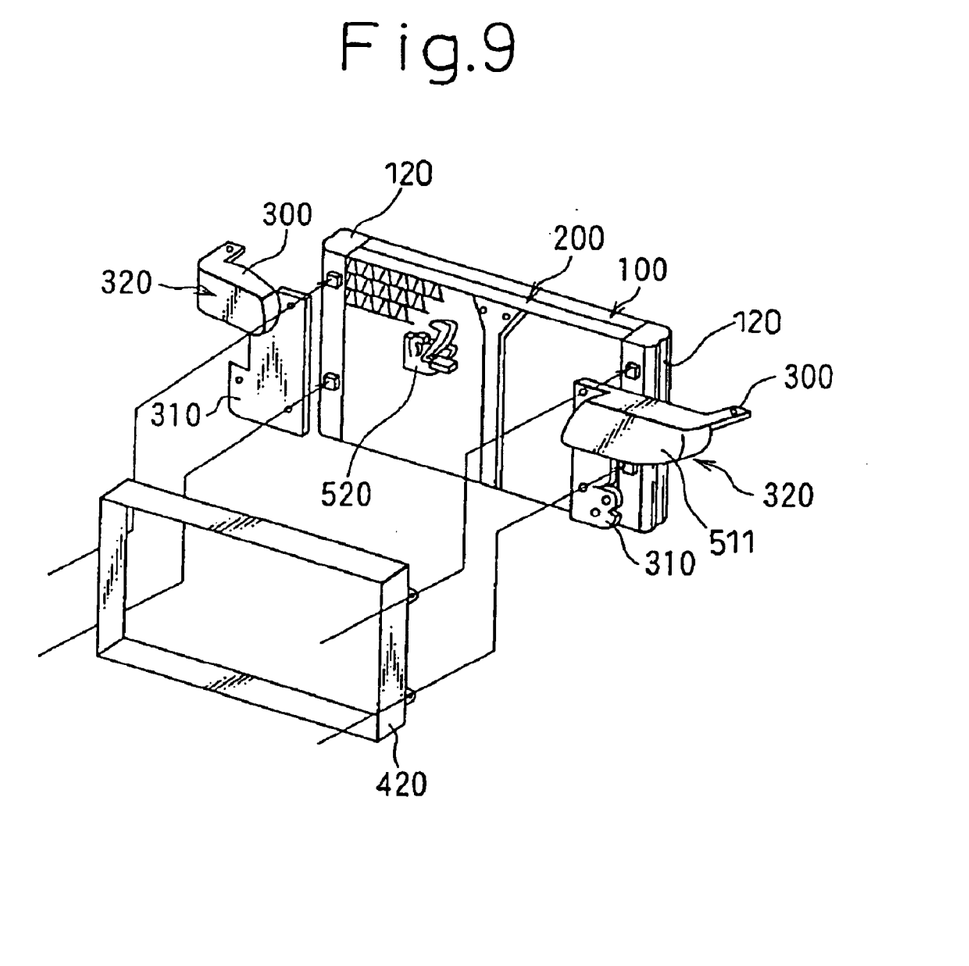
FIG. 9 is an exploded perspective view showing a structure for mounting a heat exchanger according to a fifth embodiment.
Figure 10:
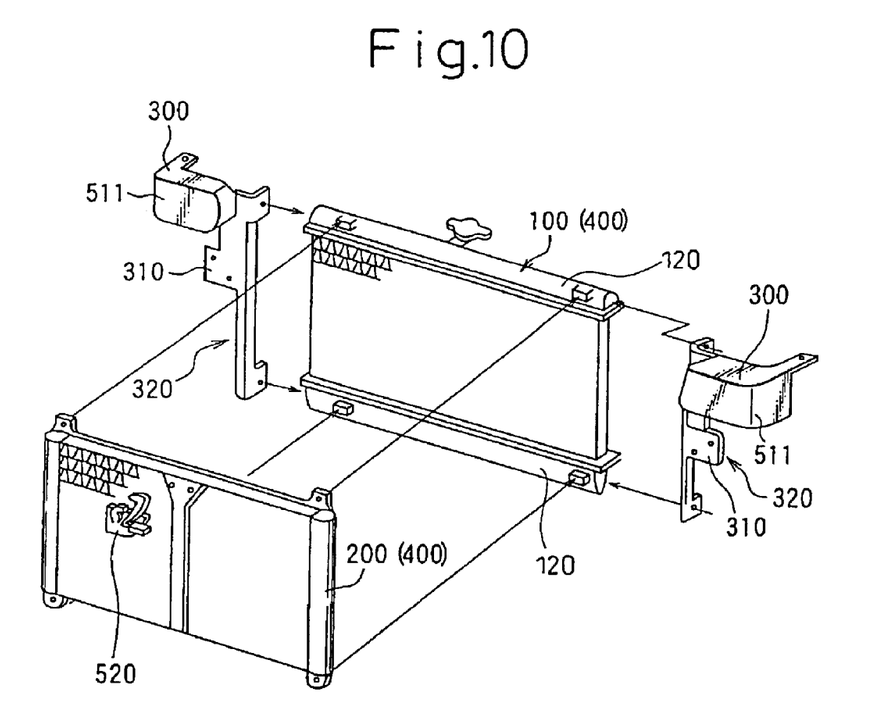
FIG. 10 is an exploded perspective view showing a structure for mounting a heat exchanger according to a modification of the fifth embodiment of the invention.

According to this embodiment, as shown in FIGS. 9 and 10, the first and second brackets 300, 310 are integrated with a housing 511 (the assembly in claims) on which the headlight is assembled. Each of the resulting bracket units 320 thus integrated is integrated with (integrally assembled on) the corresponding radiator tank 120 by joining means such as brazing or welding or by fastening means such as bolts.

In this embodiment, FIG. 9 shows an example of arrangement in which the longitudinal direction of the radiator tank 120 coincides with the vertical direction. On the other hand, FIG. 10 shows a modification as an example of arrangement in which the longitudinal direction of the radiator tank 120 coincides with the horizontal direction.

According to this embodiment, in the case where the bracket unit 320 is assembled on the corresponding radiator tank 120 by fastening means such as bolts, the two may be fixedly assembled to each other through an elastic member such as a rubber vibration isolator. As another alternative, the bracket unit 320 and the headlight 510 may be integrated with each other.

(Sixth Embodiment)

Figure 11:
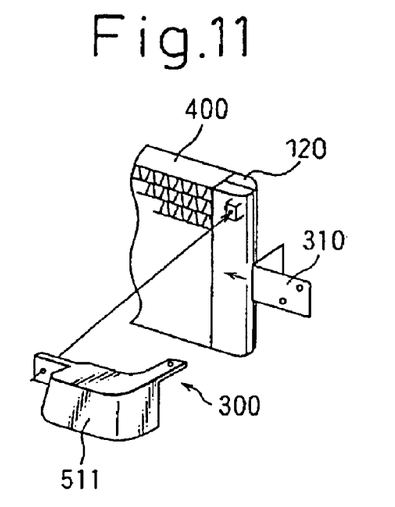
FIG. 11 is an exploded perspective view showing the portion of a heat exchanger having a headlight mounted thereon according to a sixth embodiment of the invention.

In this embodiment, as shown in FIG. 11, the first bracket 300 is integrated with the headlight housing 511 to be assembled, and the resultant assembly is integrated with (integrally assembled on) the radiator tank 120 by joining means such as brazing or welding or by fastening means such as bolts. At the same time, the second brackets 310 formed separately from the first brackets 300 are integrated with (integrally assembled on) the radiator tank 120 by joining means such as brazing or welding or by fastening means such as bolts.

(Seventh Embodiment)

Figure 12:
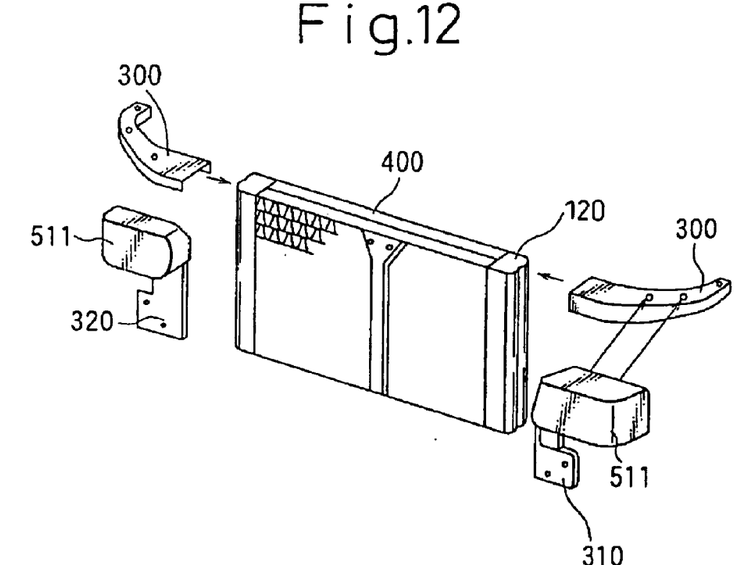
FIG. 12 is an exploded perspective view showing the portion of a heat exchanger having a headlight mounted thereon according to a seventh embodiment of the invention.

In this embodiment, as shown in FIG. 12, a second bracket 310 is integrated with a corresponding headlight housing 511 making up an assembling portion, and the resultant assembly is integrated with (integrally assembled on) the radiator tank 120 by the condenser and the radiator. At the same time, the first brackets 300 formed separately from the second bracket 310 are integrated with (integrally assembled on) the radiator tank 120 by joining means such as brazing or welding or by fastening means such as bolts.

(Other Embodiments)

Each of the embodiments described above refers to a heat exchanger in which the condenser of the air climate control system and the radiator for cooling the engine are integrated with each other. The type of heat exchanger, however, is not limited to those described in the aforementioned embodiments, but may be an intercooler for cooling the intake air pressured by the supercharger or an oil cooler for cooling the engine oil or the working oil such as ATF (automatic transmission fluid).

Also, the means for integrating the condenser and the radiator with each other is not limited to the joining means such as brazing or welding, but may be fastening means such as bolts.

Further, unlike in the first embodiment in which the horn 530 and the various sensors 540 are assembled on the air duct 420, an assembling portion like the headlight 510 for assembling the horn 530 and the various sensors 540 may be formed on the bracket 300, and these parts may be assembled on the bracket 300.

Furthermore, instead of fixing the air duct 420 to the heat exchanger 400 by joining means such as bolts in the first embodiment, the air duct 420 may be made of a metal and coupled to the heat exchanger 40 by joining means such as brazing or welding.

By the way, in this invention, the mounting portion refers to the portion of the heat exchanger 400 on which the headlight housing is mounted independently as designated by reference numeral 511 in FIGS. 10 to 13, or the portion (assembling portion) of the heat exchanger 400 on which the headlight 510 is mounted through some member as designated by reference numeral 301 in FIGS. 1 and 9.

What is claimed is:

1. A structure mounted to a vehicle body of a vehicle, the structure comprising:
    a heat exchanger having a first and a second side;
    first beam-like bracket attached to the first side of the heat exchanger and a second beam-like bracket attached to the second side of the heat exchanger, said first and second beam-like brackets and said heat exchanger extending transversely across the vehicle, each beam-like bracket being formed with an assembling portion for assembling equipment other than the heat exchanger, the heat exchanger being mounted on the vehicle through the first and second brackets, the second beam-like bracket being separate from the first beam-like bracket;
    wherein the heat exchanger and the first and second beam-like brackets act as a reinforcing member for reinforcing the vehicle body when mounted on the vehicle.

2. A structure mounted on a vehicle, the structure comprising:
    a heat exchanger having a plurality of tubes for passing a fluid therethrough, and header tanks arranged at longitudinal ends, respectively, of the plurality of tubes and communicating with the plurality of the tubes, and
    a first beam-like bracket mounted directly on one of said header tanks and a second beam-like bracket mounted directly on the other of said header tanks, the second beam-like bracket being separate from the first beam-like bracket, the first and second beam-like brackets and the heat exchanger extending in a horizontal direction and being fixed to the vehicle.

3. A structure mounted on a vehicle, the structure comprising:
    a first heat exchanger including a plurality of first tubes for passing a first fluid therethrough and first header tanks arranged at longitudinal ends, respectively, of the plurality of first tubes for communicating with the plurality of first tubes thereby to exchange heat between air and the first fluid;
    a second heat exchanger including a plurality of second tubes for passing a second fluid therethrough and second header tanks arranged at longitudinal ends, respectively, of the plurality of second tubes for communicating with the plurality of second tubes thereby to exchange heat between air and the second fluid, the first and second heat exchangers being arranged integrally in series with each other along the direction of air flow, and
    a first beam-like bracket extending in a horizontal direction and fixed on the vehicle is directly coupled to or integrated with one of said first header tanks, and a second beam-like bracket extending in a horizontal direction and fixed on the vehicle is directly coupled to or integral with the other of said first header tanks, said second beam-like bracket being separate from said first beam-like bracket.

4. The structure as described in claim 2, wherein said beam-like brackets are each formed with an assembling portion for assembling equipment other than the heat exchanger.

5. The structure as described in claim 3, wherein said beam-like bracket is formed with an assembling portion for assembling equipment other than the heat exchanger.

6. The structure as described in claim 2, wherein said beam-like brackets are each formed with an assembling portion for assembling a headlight.

7. The structure as described in claim 3, wherein said beam-like bracket is formed with an assembling portion for assembling a headlight.

8. The structure as described in claim 4, wherein each of said beam-like brackets comprise two components, one formed with the assembling portion and the other not formed with the assembling portion.

9. The structure as described in claim 5, said beam-like bracket comprises two components, one formed with the assembling portion and the other not formed with the assembling portion.

10. The structure as described in claim 8, wherein the two components and the assembling portion are integrated with each other.

11. The structure as described in claim 9, wherein the two components and the assembling portion are integrated with each other.

12. The structure as described in claim 6, wherein in each of said beam-like brackets comprise two components, one formed with the assembling portion and the other not formed with the assembling portion.

13. The structure as described in claim 7, said beam-like bracket comprises two components, one formed with the assembling portion and the other not formed with the assembling portion.

14. The structure as described in claim 12, wherein the two components and the assembling portions are integrated with each other.

15. The structure assembly as described in claim 13, wherein the two components and the assembling portions are integrated with each other.

16. The structure as described in claim 1, wherein a hood lock for locking a hood is secured to said heat exchanger.

17. The structure as described in claim 1, wherein said beam-like brackets are fixed to side members of the vehicle body.

18. The structure as described in claim 17, wherein said beam-like brackets are fixed to a front side of said side members of the vehicle body.

19. The structure as described in claim 1, wherein said beam-like brackets comprise a first portion extending transversely across the vehicle and a second portion extending in an up and down direction.

20. The structure as described in claim 2, wherein said header tanks of said heat exchanger extend in an up and down direction.

21. A structure mounted to a vehicle body of a vehicle, the structure comprising:

a heat exchanger;

a pair of beam-like brackets extending transversely across the vehicle and also extending vertically to directly support opposite sides of the heat exchanger, each beam-like bracket being formed with an assembling portion for assembling equipment other than the heat exchanger, said beam-like brackets being fixed to side members of the vehicle body and being separate from each other;

wherein the heat exchanger is mounted on the vehicle through the pair of beam-like brackets, and the heat exchanger and the pair of beam-like brackets constitute a strength member of the vehicle.

22. A structure mounted to a vehicle body of a vehicle, the structure comprising:

a heat exchanger;

a first beam-like bracket extending transversely across the vehicle and coupled to a first side of the heat exchanger and a second beam-like bracket extending transversely across the vehicle and coupled to a second side of the heat exchanger, the second side being opposite to the first side the second beam-like bracket being separate from the first beam-like bracket, the first and second beam-like brackets being fixed to side members of the vehicle body;

wherein the heat exchanger is mounted on the vehicle through the first and second beam-like brackets, and the heat exchanger and the first and second beam-like brackets constitute a strength member of the vehicle.

* * * * *

UNITED STATES PATENT AND TRADEMARK OFFICE
CERTIFICATE OF CORRECTION

PATENT NO.   : 6,827,129 B2
DATED        : December 7, 2004
INVENTOR(S)  : Ikuo Ozawa et al.

It is certified that error appears in the above-identified patent and that said Letters Patent is hereby corrected as shown below:

<u>Title page,</u>
Item [56], References Cited, FOREIGN PATENT DOCUMENTS,
"WO 090/26078" should be -- WO 00/26078 --

<u>Column 8,</u>
Line 49, delete "in"

Signed and Sealed this

Twenty-fourth Day of May, 2005

JON W. DUDAS
*Director of the United States Patent and Trademark Office*